July 30, 1968

H. H. TORMOLEN 3,394,620

TRANSMISSION MECHANISM

Filed Feb. 26, 1965

H. H. TORMOLEN 3,394,620

TRANSMISSION MECHANISM

Filed Feb. 26, 1965

United States Patent Office 3,394,620
Patented July 30, 1968

---

3,394,620
TRANSMISSION MECHANISM
Hans H. Tormolen, 3142 Sumter, Dallas, Tex. 75220
Filed Feb. 26, 1965, Ser. No. 435,482
21 Claims. (Cl. 74—752)

The present invention relates to an improved transmission. In a more specific aspect, the present invention relates to an improved power transmission for automobiles.

In the art of power transmission, many and varied mechanisms have beeen proposed for the conversion of rotational power from an engine to a driven mechanism, such as the wheels of an automobile. In most such transmissions, a change in the speed of the driven mechanism is effected by mechanically changing gear ratios. In other transmissions, the change in speed is frequently effected by changing pressure in a hydraulic-type system. However, each of these basic types of transmission has certain undesirable features. For example, where mechanically shifted gears are employed, such gears are subject to rapid wear, particularly when shifting from one gear to another takes place. In the hydraulic-type systems, it is obvious that maintaining a pressurized fluid in a system is difficult, and the problem of providing and maintaining adequate seals to prevent leakage of the transmission fluid becomes a serious problem.

It is therefore an object of the present invention to provide an improved transmission.

A further object of the present invention is to provide an improved transmission for varying the relative speed between a driving mechanism and a driven mechanism.

Yet another object of the present invention is to provide an improved transmission for automobiles.

Another and further object of the present invention is to provide an improved transmission for turbine-type engines.

A still further object of the present invention is to provide an improved transmission for automobiles utilizing turbine-type engines.

Another object of the present invention is to provide an improved transmission utilizing gyroscopic forces as a means for varying the transmission output speed.

A further object of the present invention is to provide an improved transmission utilizing variable gyroscopic forces to vary the transmission output speed.

Still another object of the present invention is to provide an improved transmission utilizing eccentric forces to vary the transmission output speed.

Another and further object of the present invention is to provide an improved transmission utilizing variable eccentric forces to vary the transmission output speed.

Yet another object of the present invention is to provide an improved transmission utilizing both gyroscopic and eccentric forces to vary the transmission output speed.

A further object of the present invention is to provide an improved transmission utilizing variable gyroscopic and eccentric forces to vary the transmission output speed.

Still another object of the present invention is to provide an improved transmission adapted to generate electrical power.

These and other objects and advantages of the present invention will be apparent from the following detailed description when read in conjunction with the drawings, wherein.

Figures 1, 2:
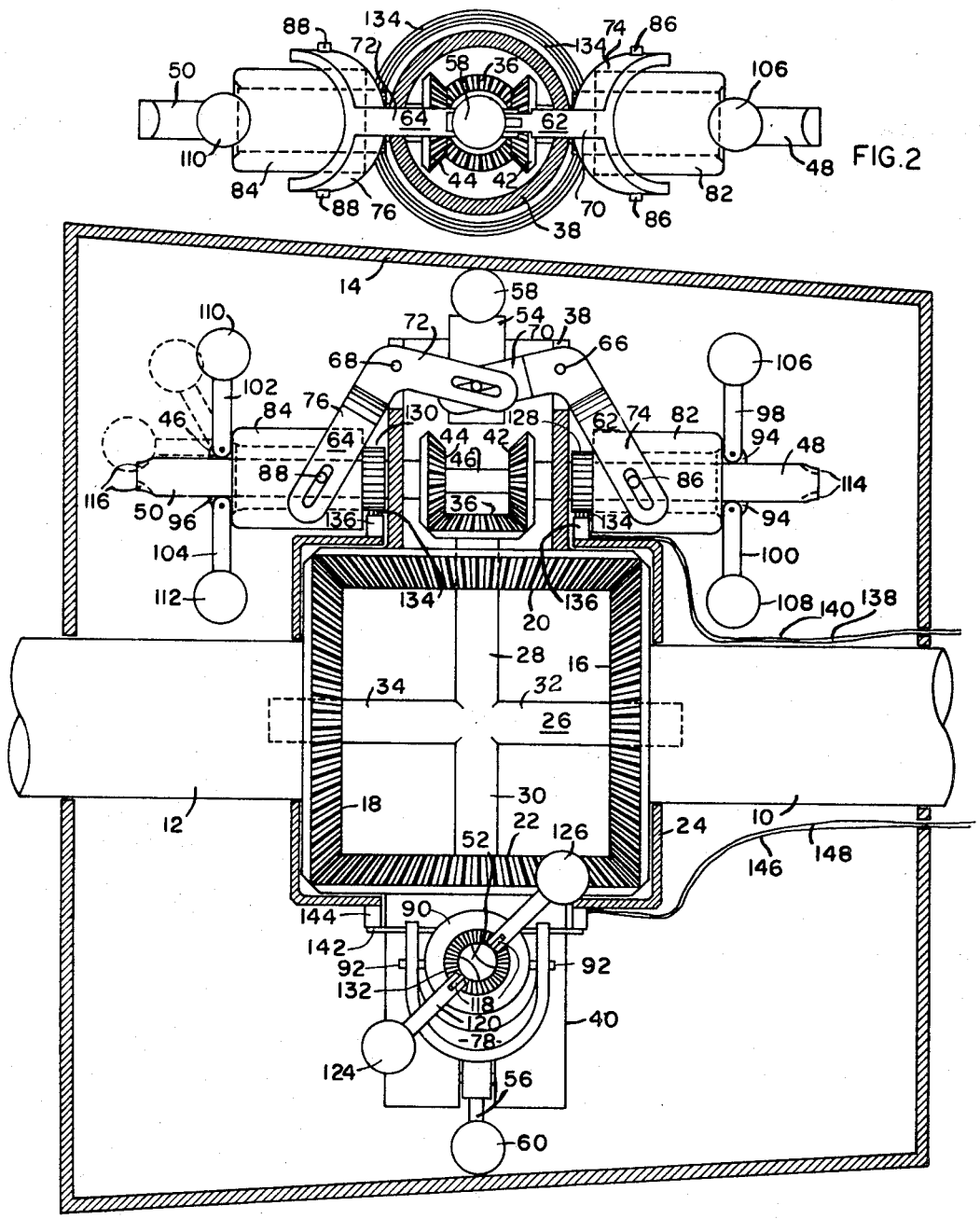
FIGURE 1 is an elevational view, partially in section, of the improved transmission of the present invention.
FIGURE 2 is a plan view, partially in section, of the satellite portion of the transmission of the present invention.

Referrng specifically to FIGURES 1 and 2 of the drawings, the numeral 10 represents a driving shaft which is rotated at a predetermined, fixed speed by an engine or other prime mover. As previously indicated, the present transmission is best suited to turbine-type engines whose output speed is essentially constant. Driven shaft 12 is adapted to drive the mechanism in question, and in its preferred use would drive the wheels of an automobile or the like. Surrounding the entire transmission and longitudinally sildeable on shafts 10 and 12 is housing 14. As will be hereinafter pointed out in the discussion of the operation of the transmission, it is the sliding movement of housing 14 which adjusts the transmission and, therefore, the output speed of driven shaft 12. Obviously, mechanisms other than housing 14 can be utilized to effect this adjustment and such other mechanisms will be referred to hereinafter. Rigidly attached to the free end of driving shaft 10 is bevel gear 16. Complementary bevel gear 18 is a mirror image of bevel gear 16 and is rigidly attached to the free end of driven shaft 12. Mounted perpendicular to gears 16 and 18, and in operative contact therewith, are bevel gears 20 and 22, respectively. In the arrangement shown, bevel gears 16, 18, 20 and 22 form an epicyclic gear train. Enclosing gears 16, 18, 20 and 22 is main gear box 24. Gear box 24 is also rotatable relative to shafts 10 and 12 and such rotation will be described in detail in the description of the operation of the transmission. Gears 20 and 22 are rotatably mounted on dead center 26, which is made up of arms 28 and 30, and, perpendicular thereto, arms 32 and 34. Thus, dead center 26 forms an X adapted to suport gears 20 and 22 and their appurtenant elements. Gears 20 and 22 are rotatable about arms 28 and 30, respectively, of dead center 26. Arms 32 and 34 of dead center 26 pass through gears 16 and 18 and into shafts 10 and 12, respectively. Arms 32 and 34 are rotatable within gears 16 and 18 and shafts 10 and 12. This mounting of dead center 26 thus provides a mounting shaft for gears 20 and 22 and also provides a shaft upon which gears 20 and 22 may rotate about an axis coincident with the axes of shafts 10 and 12. Rigidly mounted on the free end of arm 28 of dead center 26 is smaller bevel gear 36. A gear of the same character and size as gear 36 is mounted on the free end of arm 30 of dead center 26 but has not been shown in the figures, since it is a substantial duplicate of gear 36. Rigidly attached to the outer surface of gears 20 and 22, respectively, are secondary gear boxes 38 and 40. Appropriate seals are provided between secondary gear boxes 38 and 40 and main gear box 24 so that lubricating oil may be retained within main gear box 24 and secondary gear boxes 38 and 40 may be rotated relative to main gear box 24. Gear boxes 38 and 40 are of the same construction, and FIGURE 1 shows the two roatated 180° with respect to one another. Disposed within gear box 38 are bevel gears 42 and 44. Bevel gears 42 and 44 are mirror images of one another and are mounted in operative contact with bevel gear 36. Holding bevel gears 42 and 44 the proper distance apart and partially supporting said gears is idler shaft 46, which is adapted to permit free rotation of bevel gears 42 and 44 thereabout. Bevel gears, of the same character as gears 42 and 44, connected by an idler shaft, such as 46, are mounted in secondary gear box 40 in operative contact with the bevel gear mounted on the free end of arm 30 of dead center 26. These bevel gears operate in exactly the same fashion as gears 42 and 44 and idler shaft 46 but have not been shown so that other features of the invention may be more clearly illustrated. Rigidly attached to bevel gears 42 and 44, on the outermost faces thereof, and passing rotatably through secondary gear box 38 are satellite shafts 48 and 50, respectively. Appropriate seals are formed about satellite shafts 48 and 50 where these shafts pass through secondary gear box 38, so that an appropriate lubricant may be maintained within gear box 38. Passing into secondary gear box 40 and rigidly attached to one of the gears in box 40 which is equivalent to gears 42 and 44 is satellite shaft 52. A complementary satellite shaft passes through the opposite side of gear box 40 and is rigidly connected to the other of the satellite shaft would, of course, extend rearwardly as gear box 40 is oriented in FIGURE 1. Slideably passing through the ends of secondary gear boxes 38 and 40 are plungers 54 and 56, respectively. Plungers 54 and 56 are adapted to slide into and out of gear boxes 38 and 40 and, accordingly, have appropriate seals thereabout to retain oil within gear boxes 38 and 40. On the outermost free ends of plungers 54 and 56 are ball-shaped contacts 58 and 60. Contacts 58 and 60 are adapted to contact the interior surface of housing 14, and the depth to which plungers 54 and 56 are pressed into gear boxes 38 and 40 is controlled by the longitudinal movement of housing 14. Means other than housing 14 can be provided for the adjustment of plungers 54 and 56. For example, an expandable and contractible band in contact with contact portions 58 and 60 of plungers 54 and 56 would serve the same function. Pivotally mounted in the outer shell and passing through gear box 38 are L-shaped links 62 and 64, respectively. Links 62 and 64 are pivoted near the knee of the L on pivots 66 and 68, respectively, which are mounted within the shell of gear box 38. The ends of bases 70 and 72 of links 62 and 64 are pivotally mounted on plunger 54. Body portions 74 and 76, re-respectively, of links 62 and 64 terminate in prong-shaped ends. A similar link 78, having prong-shaped body portion 80, passes through gear box 40 in the same fashion as links 62 and 64 and has the end of its base portion pivotally attached to plunger 56 in gear box 40. A similar link is mounted on the opposite side of gear box 40. Surrounding and slideably mounted on satellite shafts 48 and 50 are control sleeves 82 and 84, respectively. Control sleeves 82 and 84 are adjusted longitudinally with respect to satellite shafts 48 and 50 by links 62 and 64, respectively, which are pivotally connected to sleeves 82 and 84 through pivot means 86 and 88. It is to be observed that when plunger 54 is extended a preselected maximum distance from gear box 38, sleeves 82 and 84 will assume their innermost positions adjacent gear box 38; and, when plunger 54 is depressed into gear box 38 and extends from gear box 38 a preselected minimum distance, sleeves 82 and 84 are at their furthest extremes toward the free ends of satellite shafts 48 and 50. Appropriate stops may be provided on plunger 54, on links 62 and 64 or on sleeves 82 and 84 to limit the movements of plunger 54 between these two extremes. Mounted on satellite shaft 52 is sleeve 90. Sleeve 90 has attached thereto link 78 through pivot means 92. A complementary sleeve and pivot means is mounted on the satellite shaft on the opposing side of gear box 40. Rigidly attached to satellite shafts 48 and 50 on opposing sides of the shafts are mounting tabs 94 and 96, respectively. Pivotally connected to tabs 94 and 96 are arms 98 and 100 and arms 102 and 104, respectively. Rigidly attached to the free ends of arms 98, 100, 102 and 104 are weights 106, 108, 110 and 112, respectively. As shown in FIGURE 1, weights 106, 108, 110 and 112 are adapted to pivot to a position where arms 98, 100, 102 and 104 are perpendicular to satellite shafts 48 and 50. However, by sliding sleeves 82 and 84 outwardly toward the free ends of satellite shafts 48 and 50, the angle which arms 98, 100, 102 and 104 make with respect to satellite shafts 48 and 50 may be adjusted. Two possible alternate positions are shown by dashed outlines in FIGURE 1. Shafts 48 and 50 have circular depressions 114 and 116, respectively, formed in their sides to receive weights 106, 108, 110 and 112, when arms 98, 100, 102 and 104 are completely collapsed and said arms are parallel to shafts 48 and 50. In this collapsed position, the weights essentially form an extension of the shafts for all intents and purposes. Mounted on shaft 52 are tabs 118. Pivoted to tabs 118 are arms 120 and 122 and rigidly mounted on the free ends of arms 120 and 111 are weights 124 and 126, respectively. A like pair of tabs, arms and weights are mounted on the opposite side of gear box 40.

The transmission of the present invention may be utilized as an electrical generator in addition to or independently of its function of varying the output speed of an engine. This is accomplished by providing appropriate generator means on the satellite shafts and their appurtenant elements. For example, a suitable rotor 128 may be mounted on satellite shaft 48 and like rotors 130 and 132 may be mounted on satellite shafts 50 and 52, respectively. While no reference will hereafter be made to such a generator, a duplicate generator will obviously be mounted on the shaft behind gear box 40 in FIGURE 1. Appropriate field windings (not shown) are formed inside sleeves 82, 84, and 90, respectively. One or more commutator take-off discs 134 are mounted annularly about gear box 38 and are held to gear box 24 and in contact with armatures 128 and 130 by mounting tabs 136. Electrical lines 138 and 140 pass from discs 134 to a battery or other load. Lines 138 and 140 may be conventionally mounted on shaft 10 to rotate therewith. It is obvious that annular bands may likewise be mounted on gear box 24 and held in contact with brushes attached to the field windings or both annular discs and annular bands may be employed if generators other than the simple DC generator shown is contemplated. Like conductor discs 142 are mounted on gear box 24 surrounding gear box 40 by means of mounting tabs 144 and are in contact with armature 132. Electrical lead lines 146 and 148 lead from discs 142 to the battery or load. It is also possible to take-off power in numerous other ways. For example, appropriate contacts inside armature 128 and shaft 48 may supply conductors leading from shaft 48 to the center of shaft 46. Appropriate contacts adjacent the center of shaft 46 may be tied to conductors passing through arm 28 and arm 32 of dead center 26 and thence through driving shaft 10. Appropriate take-off contacts can then be provided on shaft 10 to permit the take-off of power exteriorly of housing 14.

The operation of the transmission of the present invention will be described with particular reference to FIGURES 3 through 6, inclusive of the drawings. However, appropriate reference will be made to FIGURES 1 and 2 where clarification will result.

Figure 3:
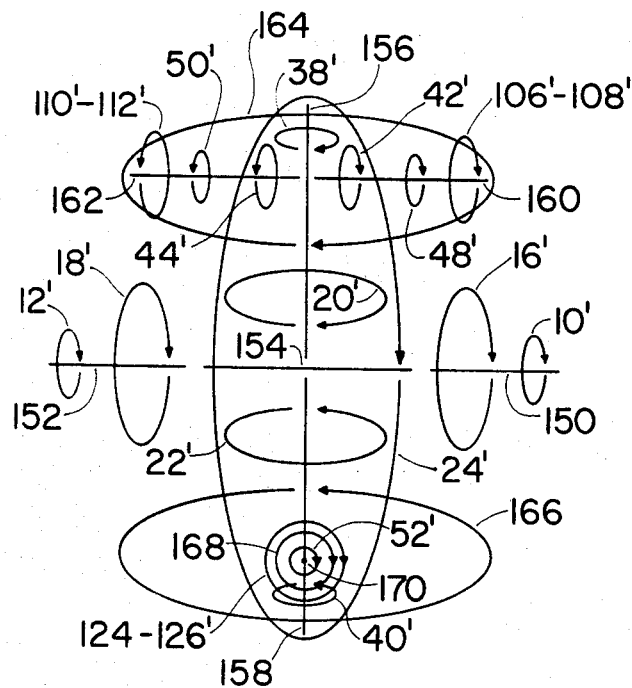
FIGURE 3 is a schematic diagram illustrating the rotational movements of the major rotating parts of the transmission of the present invention.

FIGURE 3 of the drawings shows the relative movement of the various parts of the transmission. To further simplify the explanation, imaginary axes are shown to represent various parts of the device. In order to facilitate the description, axes, which may be considered, in a sense, a continuous axis or essentially a continuous revolving part, have been broken primarily to show the independent rotation of the several elements and their rotation with respect to other elements. Where possible in FIGURE 3, numerals previously employed in FIGURE 1 are utilized with an asterisk to represent the part whose rotation is shown or the part having the imaginary axis shown. In accordance with FIGURE 3, it is to be seen that shaft 10, represented as rotation 10', and gear 16, represented by rotation 16', rotate about an axis 150 passing through the center of these two elements. As shown, the rotations 10' and 16' are independent of the other axes of rotation shown. Likewise, shaft 12, represented by rotation 12', and gear 18, represented by rotation 18', rotate about axis 152. These rotations 12' and 18' are also independent of axis 150 and the other axes shown in the drawing. Main gear box 24, represented by rotation 24', rotates about axis 154 which again is essentially independent of axes 150 and 152, even though, as a practical matter, one continuous axis exists. However, it should be clearly noted at this point that rotation about axes 150, 152 and 154 are independent to the extent that each may be a different speed, as will be pointed out hereafter. Driven gears 20 and 22 are represented by rotations 20' and 22' and rotations 20' and 22' are about axes 156 and 158, respectively. Axes 156 and 158 are obviously independent of one another and rotations 20' and 22' about these axes are independent of the other axes except to the extent that rotations 20' and 22' result from rotation 16' and, in turn, create rotation 18'. Also, rotating about axes 156 and 158 are gear boxes 38 and 40, represented by rotations 38' and 40', respectively. Since gear boxes 38 and 40 are rigidly coupled to gears 20 and 22, respectively, these gear boxes will rotate about the same axes as the gears and at the same speed. Hence, the same axes of rotation, 156 and 158, are shown. Also, rotatable about axis 156 are satellite shafts 48 and 50 and this rotation is designated rotation 164. Such rotation about axis 156 also follows from the fact that satellite shafts 48 and 50 are rigidly coupled through gear box 38, which, in turn, is rigidly coupled to gear 20. In like manner, satellite shaft 52, and the satellite shaft on the opposite side of gear box 40, rotates about axis 158 and is represented by rotation 166. Since rotations 164 and 166 take place about an axis perpendicular to the primary axis 154, shafts 48, 50, 52 and the elements connected thereto are referred to as satellite systems. Satellite shafts 48 and 50 are also rotatable about axes coincident with the center line of said shafts and this rotation of satellite shafts 48 and 50 is represented by rotations 48' and 50', respectively, about axes 160 and 162, respectively. Such rotation of satellite shafts 48 and 50 is created by the rotation of gears 42 and 44, represented by rotations 42' and 44', respectively. The rotations 42' and 44' are generated by rotation 164 of the satellite system. Also rotatable about axes 160 and 162 are weight systems 106–108 and 110–112, respectively, which are represented by rotations 106'–108' and 110'–112'. The rotation of weights 106–108 and 110–12 about axes 160 and 162 provide the forces necessary for controlling the output speed of the present transmission, as will be pointed out hereinafter. The rotation of satellite shaft 52 is represented by rotation 52', the rotation of weights 124 and 126 is represented by rotations 124'–126' and the rotation of the gear in gear box 40 connected to shaft 52 is represented by rotation 168. Rotations 52', 168' and 124'–126' all take place about axis 170. A similar rotational system will, of course, apply to the shaft behind gear box 40.

Figure 4:
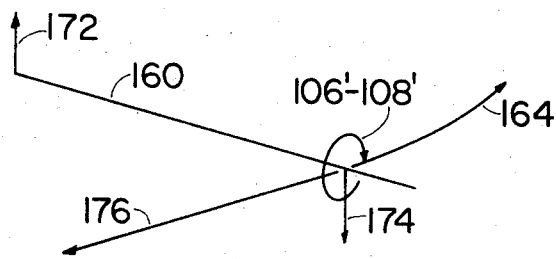
FIGURE 4 is a schematic diagram illustrating the generation of gyroscopic forces and their utilization in accordance with the present invention.

Weights 106, 108, 110, 112, 124 and 126, under certain conditions, create a gyroscopic effect designed to vary the speed of satellite systems represented by rotations 164 and 166 and ultimately the relative speeds of rotation of gears 16 and 18 and gear box 24. The principle involved is illustrated schematically in FIGURE 4 of the drawings. In FIGURE 4 only axis 160 is shown. It is to be clearly recognized, however, that the other portions of the satellite systems rotating about 162 and 170 act in exactly the same manner. Rotation 106'–108' about axis 160 is shown in FIGURE 4. This represents the rotation of weights 106 and 108. Weights 106 and 108, when rotating at a relatively high speed, create a gyroscopic effect. In accordance with known principles of the operation of the gyroscope, an upward force, represented by force vector 172, is created at the point of support of the gyroscope axis 160. This support, of course, is not a simple point support, but is a combination of the support provided by gear 42, idler 36 and the case of gear box 38. However, for simplicity, a single point is assumed. An equal and opposite force, represented by the force vector 174, is created by the weight of the gyroscope. Also, in accordance with known principles of gyroscope operation, there is a natural tendency of the gyroscope axis to precess in a given direction when an effort is made to move one end of the axis. This precession or precessional rotation is represented by rotation 176 in FIGURE 4. It is to be observed that this natural precession tendency 176 is opposite in direction to rotation 164. Accordingly, movement of the satellite system in the direction of rotation 164 will be resisted by precession forces acting in the direction of rotation 176. The relative magnitudes of the forces causing rotations 164 and 176 depend upon the relative sizes of gears 16, 20 and 42, and thus the relative speeds of the satellite system and the gyroscope, and the magnitude of the weights represented by rotation 106'–108'. By properly selecting the gear ratios and the magnitude of the weights, it is to be observed that the speed of rotation 164 can be slowed down by the precession force of the gyroscope represented by rotation 176. Also, it is to be observed, by reference to FIGURE 1, that the gyroscopic effect can be adjusted from a maximum force, when the arms supporting the weights are perpendicular to the satellite shafts, to essentially zero, when the arms are parallel to the satellite shafts, or to any intermediate value by varying the position of sleeve 82. In turn, the position of the sleeve on the satellite shaft can be varied by varying the position of plunger 54 which is controlled by the movement of housing 14. Accordingly, a varying gyroscopic effect can be created by movement of housing 14 and the precessional force, represented by rotation 176, can be varied in magnitude with respect to the forces creating rotation 164 of the satellite system. Such variation can therefore be utilized to vary the speed of output of driven shaft 12 as will be pointed out hereinafter.

Yet another force which operates in the transmission of the present invention to retard or slow down the satellite systems, and to eventually stop rotations 164 and 166 of FIGURE 3, is an eccentric force created by rotation 24'. It is to be recalled that rotation 24' results from the rotation of gear box 24 and its appurtenant elements relative to shafts 10 and 12. When the speed of rotation of gear box 24 begins to increase from zero, an eccentric effect caused by weights 106, 108, 110, 112, 124 and 126 begins to act on satellite shafts 48, 50 and 52. With no rotation of gear box 24 both weights on each of the satellite shafts will be extended the same distance from the center of the satellite shaft and will both generate a full circle of rotation the size of which depends upon the angular position of the arms suporting the weights with respect to the satellite shaft. However, as the speed of rotation of gear box 24 increases, an increasing centrifugal force operates from the center of rotation 24' and begins to decrease the angle of the weights with respect to the satellite shaft as they approach their innermost positions adjacent the gear box 24. Thus, the weights describe circles of decreasing diameter as the speed of rotation 24' increases, until ultimately in one condition of operation, an instant of time is reached when the lowermost weight is folded parallel to the satellite shaft, it locks in this position and stops the satellite systems from following rotations 164 and 166. This locking of the weights and thus the ultimate stopping of the satellite systems is caused by the eccentric forces of the weights when one of each pair of weights is fully extended and the other is in its innermost position parallel to the shaft on a given satellite shaft. This action of the weights is schematically shown in progressive stages and under two different conditions in FIGURES 5 and 6 of the drawings.

Figure 5:
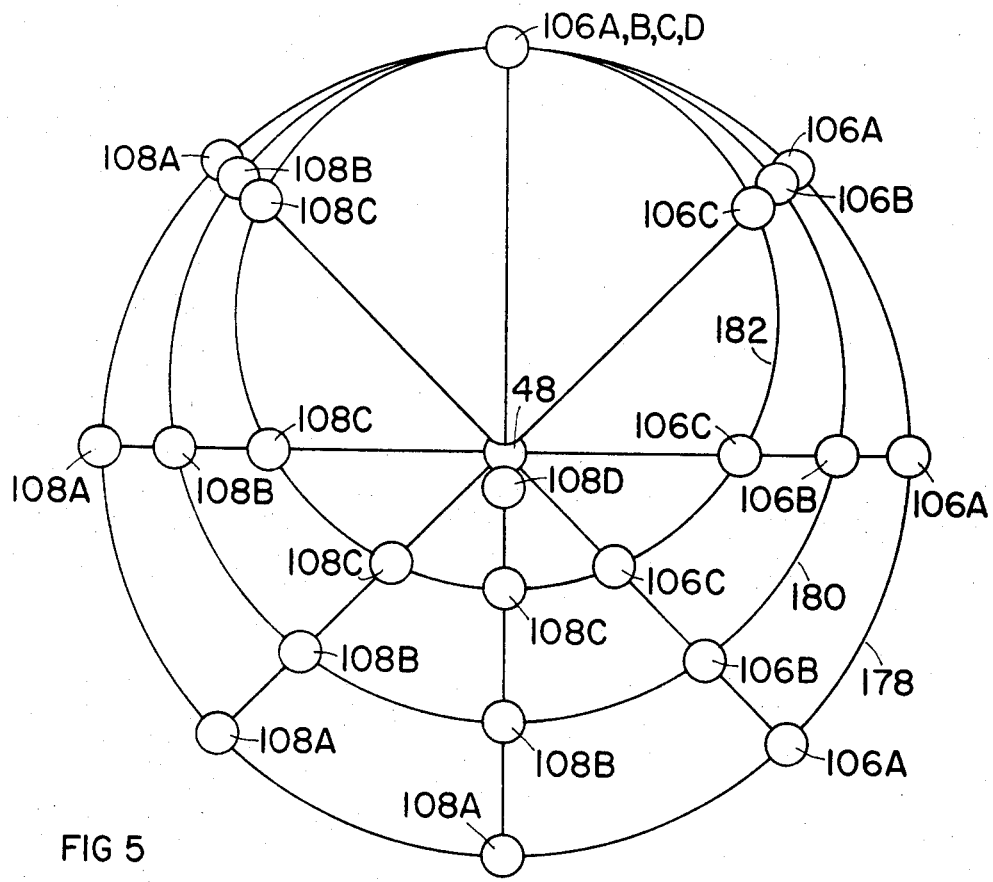
FIGURES 5 and 6 are schematic diagrams illustrating the generation and utilization of eccentric forces, in accordance with the present invention, under two sets of conditions.
Figure 6:
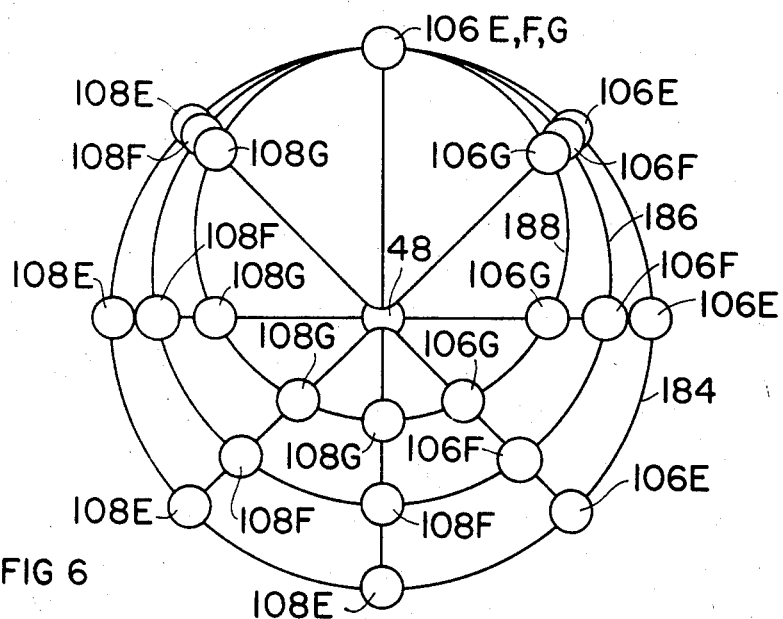

In FIGURES 5 and 6 only satellite shaft 48 and its appurtenant weights 106 and 108 is represented. This same action will, of course, apply to all of the other satellite shafts and weights. In FIGURE 5, weights 106 and 108 are first shown in their fully extended positions as represented by 106a and 108a. This represents a case in which the satellite system is rotating at its greatest speed on rotational path 164. Thus, the outer circular path 178 is followed by weights 106 and 108 rotating at their maximum speed. In this situation, however, the gyroscopic effect is dominant. As the speed of rotation of gear box 24 on rotational path 24' increases, weight 106 begins to fold inwardly as it approaches the bottom or innermost side of the transmission and weight 108 begins to fold outwardly as it leaves the bottom or innermost side and approaches the top of its swing. This is illustrated by the series 106b which shows 106 folding inwardly as it approaches the bottom and 108b folding outwardly as it approaches the top. Likewise, when 106 reaches the bottom it takes the place of 108 and 108 is then at the top, thus replacing 106. The rotation as shown by 106b and 108b follows the path 180 at a still greater speed of rotation of gear box 24 on rotational path 24'. The circle of rotation 182 is even smaller when rotation 24' is at a third still greater speed. This, is shown by 106c and 108c, when 106 approaches the bottom and 108 approaches the top. Ultimately, as shown by 106d and 108d, 108d is folded parallel to a satellite shaft 48 while 108d is at the top of its swing. At this instant the centrifugal force created by rotation 24' has become so great that all weights which are then internal or on the lower part of their swing are held against their satellite shafts and the other or opposing weights are at the top of their swing in their fully extended positions. Also, at this instant the eccentric force created on the weights at the top of their swing, as represented in FIGURE 5 by 106d, is so great that the rotation stops, thus stopping the rotation 48' of the satellite shaft 48 and, by the same token, the rotation 42' of gear 42. This stoppage of rotation 42' in turn stops rotation 20' of gear 20 and increases the speed of rotation of 24 to a maximum equal to the speed of shaft 10. The result is to essentially lock shaft 10, gear box 24 and shaft 12 together and rotate shaft 12 at the same speed as shaft 10. FIGURE 6 illustrates the principle of operation of the eccentric force when sleeve 82 is in the intermediate position shown in FIGURE 1 by the dotted outline. The gyroscopic force is at a maximum when both 106 and 108 are extended the maximum limit they can assume with the preselected position of sleeve 82. Thus weights 106 and 108 describe the largest circle of rotation 184. Circle 184 is shown as generated by 106e and 108e. This, of course, assumes no rotation of gear box 24. As the speed of rotation of gear box 24 about path 24' increases, 106 and 108 describe a smaller circle of rotation 186, as shown by 106f and 108f. As the speed of rotation of gear box 24 about rotational path 24' becomes still greater, the weights describe a still smaller circular path 188, as shown schematically by 106g and 108g. This rotational circle is the smallest attained with the limitation placed on the swing of the weights (as shown by 106e, f, g) and thus on the magnitude of the centrifugal force acting on the weights. Rather than stop rotation 42' completely, as in the case shown in FIGURE 5, the rotation 42' is slowed. This slower speed of gear 42 slows gear 20 and power is transmitted to gear 18. The speed of rotation of gear 18 and shaft 12 is of course dependent upon how much the speed of gear 20 has been reduced. In other words, weights 106 and 108 have an eccentric force applied to them, when following path 188, which will slow down or act as a brake on the rotation of satellite shaft 48; shaft 48 will continue to rotate at a slower speed; gear 20 will continue to rotate at a slower speed and the relative speed of rotation of gear 20 with respect to the speed of rotation of gear 16 will determine the speed of rotation of gear 18 and, thus, the speed of rotation of driven shaft 12.

When sleeve 82 is positioned in its outermost position where it folds weights 106 and 108 with their arms parallel to satellite shaft 48, the rotational system is in its essentially "neutral" condition. In other words, weights 106 and 108 create no gyroscopic effect which would slow down the satellite system as it follows path 164. The rotation of gear box 24 will create no eccentric force which can slow the rotation of satellite shaft 48. As a result, the satellite system will rotate at its maximum speed along path of rotation 164, gear 20 will follow path 20' at its maximum speed and gear 18 will be stationary.

From the above discussion, it is obvious that the output of the transmission or the speed of rotation of driven shaft 12 can be varied from a speed essentially equal to zero to a speed substantially equal to the speed of driving shaft 10. In the examples given below, frictional and other losses will be ignored in order to simplify the discussion. In all examples, it should first be remembered that gear box 24 is free to rotate. If the speed of shaft 10 and hence gear 16 is 100 r.p.m. and no retarding or braking forces are present to reduce the speed of gear 20 and the satellite system attached thereto, gear 20 will revolve at 50 r.p.m. and gear box 24 at 50 r.pm. In this instance, the speed of gear 18 and hence shaft 12 will be essentially zero. This, of course, is the previously described neutral position. When plungers 54 and 56 are depressed to their fullest extent, sleeves 82, 84 and 90 are at their furthest positions adjacent the free ends of satellite shafts 48, 50 and 52, and the weights are folded to a position where their supporting arms are parallel to shafts 48, 50 and 52. As previously pointed out, with the weights in this position no gyroscopic forces are effective to retard or brake the speed of the satellite system and no eccentric forces are in effect to retard or act as a brake on the speed of the satellite systems. If sleeves 82, 84 and 90 are withdrawn slightly to permit the weights to unfold a small amount so that the supporting arms of the weights form a small acute angle with the satellite shafts 48, 50 and 52, a small but significant retarding force or braking force will be applied to gear 20 and the satellite system. Initially, gear 16, rotating gear 20 at its maximum speed, will cause gyroscopic forces to be generated as the arms supporting the weights begin to unfold until the arms have unfolded to the maximum angle permitted by the selected position of sleeves 82, 84 and 90. However, as the gyroscopic force has increased, the natural precession previously discussed, has applied an increasingly greater retarding or braking force and slowed down the speed of rotation of the satellite system and, hence, gear 20, until a balance point is reached where the maximum gyroscopic force is acting on the satellite system and the greatest braking force is applied. With this maximum force acting to slow down gear 20 as much as possible with the selected setting of sleeve 82, gear case 24 will necessarily have increased in its speed of rotation until it reaches a maximum speed dependent upon the effective gyroscopic force and consequently proportional to the retarded speed of gear 20. As the speed of gear box 24 increases from its original neutral speed, the previously mentioned eccentric forces acting on the weights of the satellite shafts retard the rotation of the satellite shafts themselves and in doing so retard or brake the speed of rotation of the satellite system and gear 20. It can, therefore, be seen that the eccentric forces progressively compensate for the losses in gyroscopic forces resulting from the slowdown of gear 20 and the satellite system and eventually substantially completely replace the retarding action of the gyroscopic forces. Thus, initially the gyroscopic forces increase from zero to a maximum and in doing so slow down the satellite system and gear 20. However, while this slowing down reduces the gyroscopic forces progressively, it increases the speed of gear box 24, thus increasing the eccentric forces until ultimately the eccentric forces are at a maximum and the gyroscopic forces are essentially zero. To take a specific example, if gear 16 is rotating at 100 r.p.m., gear 20 will rotate at 50 r.p.m., gear 24 at 50 r.p.m. and gear 18 will be stationary or at 0 r.p.m. This is the neutral condition. However, if gear 16 is rotating at 100 r.p.m., and the speed of gear 20 has been reduced to a final speed of 30 r.p.m., gear box 24 will be rotating at a speed of 70 r.p.m. This, of course, necessarily follows, since the sum of the speeds of gear 20 and gear box 24 must equal the speed of gear 16. With gear box 24 rotating at a greater speed than gear 20, gear 18 must then rotate at a speed equal to the difference between the speed of gear box 24 and that of gear 20. Accordingly, gear 18 will be rotating at 40 r.p.m. If gear 16 is rotated at 100 r.p.m. and the speed of gear 20 is 10 r.p.m., the speed of gear box 24 will be 90 r.p.m., and that of gear 18, 80 r.p.m. Thus, it is to be seen that the ultimate effect of reducing the relative speed of gear 20 or, in essence, applying a brake to gear 20 while gear box 24 is free to rotate is to increase proportionately the speed of gear 18. Finally, if gear 16 is rotating at 100 r.p.m. and the rotation of gear 20 is stopped completely, gear box 24 will rotate at 100 r.p.m. as will gear 18. This, of course, is the maximum speed at which gear 18 may be driven and it is the condition previously discussed in which gear 16, gear box 24 and gear 18 are esentially locked together and there is a direct drive from shaft 10 to shaft 12.

It is, of course, obvious that gears 20 and 22 can be formed with larger or smaller numbers of teeth than gears 16 and 18 and, as a result, the exemplified output speeds would vary by lesser or greater for a given retarding force applied. For example, if gears 20 and 22 have twice as many teeth as gear 16 and gear 18, the rotation of gear 16 at 100 r.p.m. would result in gear 20 rotating at 100 r.p.m. if no retarding force is applied. Under this condition, gear box 24 would rotate at zero r.p.m. and gear 18 would rotate at 100 r.p.m. As the speed of gear 20 is retarded, the speed of gear box 24 increases and the output speed of gear 18 decreases, until a point is reached where gear 20 and gear box 24 are both rotating at 50 r.p.m. and gear 18 is stopped. This then represents a neutral condition for this example. By continuing to decrease the speed of gear 20, the speed of gear box 24 can be still further increased and the speed of gear 18 will become progressively greater. However, it should be recognized that this latter phase of speed adjustment is not particularly desirable, since a very large reduction in the speed of gear 20 is needed to effect a given change in the speed of gear 18. In fact, it is to be observed that even in the phase of speed adjustment where the speed of gear 20 is between 50 and 100, a greater reduction in the speed of gear 20 is necessary to effect a given change in the speed of gear 18 than was required in the first example where the gear 20 had the same number of teeth as gears 16 and 18. If, on the other hand, gear 20 were made one-half the size of gears 16 and 18 and gear 16 were rotated at 100 r.p.m., gear 20 would rotate at 25 r.p.m.; gear box 24 at 75 r.p.m.; and gear 18 would always have an output which, in this example, would be 50 r.p.m. If, in this case, the speed of gear 20 were reduced, the speed of gear box 24 would increase; and the output speed of gear 18 would increase progressively until it reached a maximum of 100 r.p.m., when gear 20 is at 0 r.p.m. and gear box 24 is at 100 r.p.m.

It should also be recognized that gears 36, 42 and 44 may be varied in size relative to gears 20 and 22, and 16 and 18, respectively. The variation of the size of these gears will, of course, effect the gyroscopic and eccentric forces generated in the satellite system and the time required for these forces to become fully effective.

While the illustrations and examples of the present application have shown two satellite systems represented by two rotational paths 164 and 166, it is to be recognized that more than two such systems may be spaced about gear box 24. As a matter of fact, it is preferred that an odd number of such satellite systems be equally spaced about the gear box 24 since a better balance of the system can be attained in this fashion.

Other variations and modifications in addition to those specifically mentioned will be apparent to one skilled in the art. It is accordingly to be recognized that the examples given and the specific embodiments illustrated and described are not to be considered restrictive, but that the present invention is to be limited only in accordance with the appended claims.

I claim:
1. A transmission mechanism comprising:
 (a) a rotatable, driving shaft means;
 (b) a rotatable, driven shaft means spaced from said driving shaft and axially aligned therewith;
 (c) driving bevel-type gear means rigidly attached to the end of said driving shaft;
 (d) driven bevel-type gear means rigidly attached to the end of said driven shaft;
 (e) at least two circumscribing, bevel-type gears operatively coupled to said driven and said driving gears and adapted to rotate about axes through their centers and to travel about the circumference of said driven and said driving gears;
 (f) stationary bevel gear means mounted adjacent the back face of each of said circumscribing gears adapted to remain stationary with regard to the rotation of said circumscribing gears about their axes and to travel about the circumference of said driven and said driving gears with said circumscribing gears;
 (g) at least two second circumscribing gears mounted perpendicular to the axis of each of said stationary gears and adapted to rotate about axes through their centers and travel about the circumference of said stationary gears with said first circumscribing gears as said first circumscribing gears rotate about their axes;
 (h) elongated shafts rigidly attached to each of said second circumscribing gears to travel about the circumference of said stationary gears with said second circumscribing gears and extending outwardly from the back faces of said second circumscribing gears;
 (i) a pair of elongated arms pivotally mounted on opposing sides of each of said shafts adjacent the free ends of said shafts and adapted to pivot from a position parallel to said shafts to a position perpendicular thereto;
 (j) weights mounted on the free ends of said arms;
 (k) annular sleeves mounted on said shafts intermediate said second circumscribing gears and said arms and adapted to slide longitudinally on said shafts and partially enclose said arms to vary the maximum angle said arms can form with respect to said shafts;
 (l) plunger means operatively connected to said sleeves and adapted to vary the longitudinal position of said sleeves on said shafts; and
 (m) adjusting means bearing against said plunger means and adapted to vary the position of said plunger means.
2. A transmission mechanism, comprising:
 (a) a driving shaft means;
 (b) a driven shaft means;
 (c) transmission means operably connecting said driving shaft to said driven shaft and which transmits a preselected fraction of the speed of said driving shaft to said driven shaft; and
 (d) at least one control means, included within said transmission means, comprising rotatable weight means in which the diameter of the path described by said rotatable weight means is variable, driving means to drive said rotatable weight means about an axis and adjusting means to vary the cross-sectional dimension of said path described by said rotatable weight means;
 (e) said control means thereby applying a retarding force to said transmission means proportional to said preselected portion of the speed of said driving shaft which is to be transmitted to said driven shaft and the rotational force of said rotatable weight means determining the magnitude of said retarding force.
3. A transmission in accordance with claim 2 wherein path described by the rotatable weight means is circular in cross-section.

4. A transmission in accordance with claim 3 wherein the rotatable weight means is free to describe a circle whose diameter varies between a minimum and a maximum depending upon the speed of rotation of said weight means, and the adjusting means varies the maximum diameter of said circle described by said rotating weight means.

5. A transmission in accordance with claim 2 wherein the path described by the rotatable weight means is eccentric in cross-section.

6. A transmission mechanism in accordance with claim 5 wherein the rotatable weight means is free to describe an eccentric path between a minimum and a maximum cross-sectional dimension depending upon the speed of rotation of said rotatable weight means and the adjusting means varies the maximum dimension of said eccentric path.

7. A transmission in accordance with claim 5 wherein the control means is rotatable about an axis, the transmission means further includes means for rotating said control means and the rotation of said control means causes the rotatable weight means to describe an eccentric path during its rotation, the eccentricity of said eccentric path varying with the speed of rotation of said control means.

8. A transmission in accordance with claim 7 wherein the adjusting means varies the maximum cross-sectional dimension of the eccentric path.

9. A transmission in accordance with claim 2 wherein the transmission means further includes a transmission gear means.

10. A transmission in accordance with claim 2 wherein the transmission means further includes an epicyclic gear train.

11. A transmission in accordance with claim 10 wherein the epicyclic gear train is rotatably mounted.

12. A transmission in accordance with claim 2 wherein the transmission means further includes opposing first bevel gears rigidly connected to the driving shaft and the driven shaft, respectively, and the control means further includes a circumscribing bevel gear mounted perpendicular to said first bevel gears and adapted to travel about the circumference of said first bevel gears.

13. A transmission in accordance with claim 12 wherein at least two control means including circumscribing bevel gears adapted to travel about the circumference of the first bevel gears are included in said transmission means.

14. A transmission in accordance with claim 12 wherein the control means further includes a second epicyclic gear train fixedly attached to the circumscribing gears of the first epicyclic gear train and rotatable therewith.

15. A transmission in accordance with claim 14 wherein the rotatable weight means includes elongated shafts extending from and rigidly connected to the circumscribing gears of the second epicyclic gear train.

16. A transmission in accordance with claim 15 wherein the rotatable weight means includes at least two weights attached to each of the shafts adjacent their free ends.

17. A transmission in accordance with claim 16 wherein the weights are connected to the shafts by elongated arms.

18. A transmission in accordance with claim 17 wherein the elongated arms are pivotally connected to pivot from a position parallel to the shaft to a position perpendicular thereto.

19. A transmission in accordance with claim 18 wherein the adjusting means includes annular sleeves mounted about the shafts and adapted to slide longitudinally on said shafts and over the arms to vary the maximum angle which the arms can form with the shafts.

20. A transmission in accordance with claim 19 wherein the sleeves and the shaft passing therethrough constitute an electrical generator operable by the rotation of said shafts.

21. A transmission in accordance with claim 2 wherein the transmission means further includes an epicyclic gear train and the control means applies the retarding force to the circumscribing gears of said epicyclic gear train.

References Cited

UNITED STATES PATENTS

| | | | |
|---|---|---|---|
| 1,758,252 | 5/1930 | Gardner | 74—751 |
| 1,914,865 | 6/1933 | Rath | 74—751 |
| 1,988,405 | 1/1935 | Walton | 74—773 X |
| 2,033,343 | 3/1936 | Larkin | 74—752 |
| 2,309,172 | 1/1943 | De Kanski | 74—751 |
| 2,920,505 | 1/1960 | Hine | 74—752 |
| 2,960,889 | 11/1960 | Keyser | 74—751 |
| 2,984,124 | 5/1961 | Keyser | 74—752 |

FOREIGN PATENTS

| | | |
|---|---|---|
| 692,079 | 10/1930 | France. |
| 811,317 | 4/1937 | France. |
| 887,896 | 11/1943 | France. |
| 493,387 | 10/1938 | Great Britain. |
| 595,866 | 12/1947 | Great Britain. |
| 429,569 | 1/1948 | Italy. |

OTHER REFERENCES

A.P.C. application of Zanarini, Serial No. 392,983, published May 4, 1943, 74/751.

FRED C. MATTERN, Jr., *Primary Examiner.*

ARTHUR T. McKEON, *Assistant Examiner.*